(12) United States Patent
Kim et al.

(10) Patent No.: US 8,439,335 B2
(45) Date of Patent: May 14, 2013

(54) AIR-DAMPED ENGINE MOUNT

(75) Inventors: Jae San Kim, Suwon-si (KR); Jeong Hoon Kim, Seoul (KR); Woo Hyun Lee, Gimhae-si (KR); Jae Yong Choi, Busan (KR)

(73) Assignee: Hyundai Motor Company, Seoul (KR)

( * ) Notice: Subject to any disclaimer, the term of this patent is extended or adjusted under 35 U.S.C. 154(b) by 346 days.

(21) Appl. No.: 12/432,356

(22) Filed: Apr. 29, 2009

(65) Prior Publication Data

US 2009/0266333 A1 Oct. 29, 2009

(30) Foreign Application Priority Data

Apr. 29, 2008 (KR) .................. 10-2008-0039958

(51) Int. Cl.
*F16F 5/00* (2006.01)
(52) U.S. Cl.
USPC ..................................... 267/140.13
(58) Field of Classification Search ............ 267/140.13, 267/140.11; 55/385.3, 505, 507
See application file for complete search history.

(56) References Cited

U.S. PATENT DOCUMENTS

| | | | | |
|---|---|---|---|---|
| 4,467,899 A | * | 8/1984 | Molders et al. | 188/320 |
| 4,709,907 A | * | 12/1987 | Thorn | 267/140.13 |
| 4,731,260 A | * | 3/1988 | Balding et al. | 427/236 |
| 5,174,552 A | * | 12/1992 | Hodgson et al. | 267/140.11 |
| 2005/0161411 A1 | * | 7/2005 | Boner et al. | 210/793 |
| 2005/0263452 A1 | * | 12/2005 | Jacobson | 210/484 |

FOREIGN PATENT DOCUMENTS

| | | | |
|---|---|---|---|
| JP | 60184738 | * | 9/1985 |
| JP | 61-236940 A | | 10/1986 |
| JP | 63-9742 A | | 1/1988 |
| JP | 2001-227581 A | | 8/2001 |
| JP | 2005-240872 A | | 9/2005 |

* cited by examiner

*Primary Examiner* — Bradley King
*Assistant Examiner* — Vishal Sahni
(74) *Attorney, Agent, or Firm* — Morgan, Lewis & Bockius LLP

(57) ABSTRACT

An air-damped engine mount has a filter module installed in a damping chamber formed by coupling between a main rubber and a main pipe. The air-damped engine mount may include a bolt, a main rubber into which the bolt is fitted and coupled, a hollow main pipe coupled with the main rubber and supporting the main rubber, a cover plate coupled with the main pipe to form a damping chamber between the cover plate and the main rubber, and a filter module coupled with the cover plate and configured to permit air to communicate through the filter module against flow resistance with the damping chamber and the outside, wherein the flow resistance against the air passing through the filter module regulates air pressure inside the damping chamber to reduce vibration in the main rubber.

12 Claims, 3 Drawing Sheets

AIR-DAMPED ENGINE MOUNT

CROSS-REFERENCE TO RELATED APPLICATION

The present application claims priority to Korean Patent Application Number 10-2008-0039958 filed Apr. 29, 2008, the entire contents of which is incorporated herein for all purposes by this reference.

BACKGROUND OF THE INVENTION

1. Field of the Invention

The present invention relates to an air-damped engine mount. More particularly, the present invention relates to an air-damped engine mount, which has a filter module installed in a damping chamber formed by coupling between a main rubber and a main pipe, the filter module designed to increase flow resistance against air entering and exiting the damping chamber therethrough, in order to greatly reduce vibration in the main rubber due to a change in the pressure of the damping chamber and thereby efficiently reduce vibration in the engine.

2. Background of the Invention

In general, an engine mount used for mounting an engine to a body of a vehicle has functions of not only connecting and supporting the engine to the vehicle body but also absorbing vibration or noise from the engine, which would otherwise be transmitted to the vehicle body.

As conventional engine mounts having those functions, a fluid-filled engine mount (or hydraulic engine mount) and a rubber engine mount are widely used. The fluid-filled engine mount defines therein a fluid chamber filled with fluid such as oil. The rubber mount does not define therein the fluid chamber, with its entire body made of solid rubber.

The rubber engine mount made of solid rubber consists of a small number of parts, leading to merits such as a simple fabrication process and a cheap cost. However, the problems of the rubber engine mount are that it may not sufficiently absorb vibration and noise due to poor damping efficiency.

The fluid-filled engine mount defining therein the fluid chamber filled with fluid can sufficiently absorb vibration and noise due to high damping efficiency. However, the fluid-filled engine mount have problems such as a complicated fabrication process and a considerably expensive cost since a fluid-sealing structure is required.

In order to overcome the foregoing drawbacks of the fluid-filled engine mount and the rubber engine mount, an air-damped engine mount performing pneumatic damping has been recently developed.

FIG. 1 is a schematic cross-sectional view illustrating the structure of a typical air-damped engine mount of the related art.

As shown in FIG. 1, the typical air-damped engine mount of the related art includes a bolt 10 coupling with an engine of a vehicle, a main rubber 20 into the central portion of which the bolt 10 is fitted and coupled, a hollow main pipe 30 tightly coupled with the main rubber 20 while supporting the main rubber 20 and a cover plate 40 tightly coupled with one end of the main pipe 30 to form a damping chamber 50 in a space between the cover plate 40 and the main rubber 20.

The cover plate 40 has an air hole 41 allowing the damping chamber 50 to communicate with the outside. Specifically, outside air enters the damping chamber 50 through the air hole 41 or inside air exits the damping chamber 50 through the air hole 41.

The air entering and the air exiting the damping chamber 50 serve to reduce vibration in the main rubber 20. In more detail, the main rubber 20 increases the pressure inside the damping chamber 50 when deformed downwards by vibration in the engine, so that the air exits through the air hole 41. The exiting air causes flow resistance, which in turn instantaneously reduces vibration in the main rubber.

However, in the air-damped engine mount constructed as above, the flow resistance against the entering and exiting air is very small since the air hole 41 provides direct communication with the outside. Accordingly, the effect of damping the vibration in the main rubber 20 is not sufficient.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an air-damped engine mount, which has a filter module installed in a damping chamber formed by coupling between a main rubber and a main pipe, the filter module designed to increase flow resistance against air entering and exiting the damping chamber therethrough, in order to greatly reduce vibration in the main rubber due to a change in the pressure of the damping chamber and thereby efficiently reduce vibration in the engine.

The air-damped engine mount may include a bolt, a main rubber into which the bolt is fitted and coupled, a hollow main pipe coupled with the main rubber and supporting the main rubber, a cover plate coupled with the main pipe to form a damping chamber between the cover plate and the main rubber, and a filter module coupled with the cover plate and configured to permit air to communicate through the filter module against flow resistance with the damping chamber and the outside, wherein the flow resistance against the air passing through the filter module regulates air pressure inside the damping chamber to reduce vibration in the main rubber, wherein the bolt is coupled to an engine of a vehicle and wherein the filter module is configured to form an air passage having at least one winding portion so as to increase the flow resistance.

The filter module may include an filter body including at least an air channel connected to the cover plate to fluid-communicate with the damping chamber, and a filter housing having one open side to receive the filter body therein and the other closed side spaced from the filter body with a predetermined distance to form a first buffering space therebetween.

The air-damped engine mount may further include at least a breathable porous member disposed in the first buffering space, wherein the porous member is coupled to at least a portion of an outer circumference of the filter body and/or an inner circumference of the filter housing, wherein the porous member is made of polyurethane.

The air-damped engine mount may further include at least a filter block having at least an air guide hole to control the flow resistance, wherein the filter block is coupled to at least one portion of the filter body and/or the filter housing therebetween in a longitudinal direction of the filter body and forms a buffering space between adjacent filter blocks respectively to fluid-communicate between the damping chamber and the outside through the buffering space and the air guide holes, wherein the air guide holes in the adjacent filter blocks are formed so as not to be disposed coaxial each other, wherein longitudinal axes of the air guide holes in each filter block are formed to be inclined with a longitudinal axis of the air channel with a predetermined angle so as to increase air contact time period and thus increase the flow resistance.

The air-damped engine mount may further include at least a breathable porous member disposed in the buffering space defined between the adjacent filter blocks, wherein the porous member is coupled to at least a portion of an outer circumference of the filter body and/or an inner circumference of the filter housing and, wherein the porous member is made of polyurethane.

The filter block disposed near to the cover plate may be spaced from the cover plate with a predetermined gap so as to increase the flow resistance.

The open side of the filter housing may be spaced from the cover plate with a predetermined gap so as to increase the flow resistance.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION(S)

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
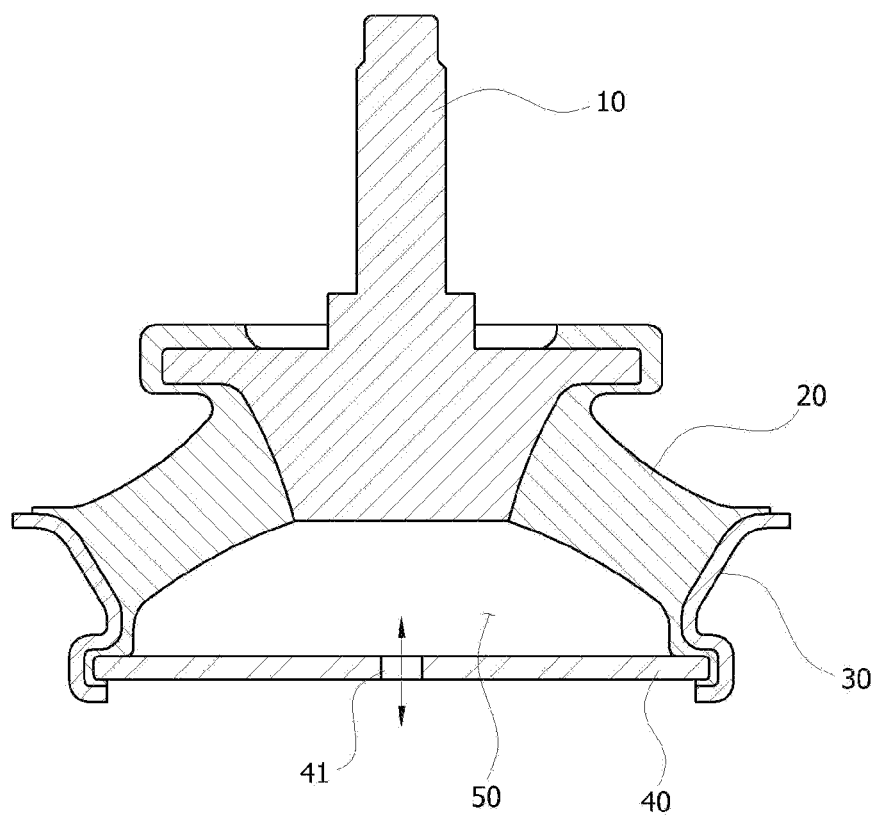
FIG. 1 is a schematic cross-sectional view illustrating the structure of a typical air-damped engine mount of the related art.
Figure 2:
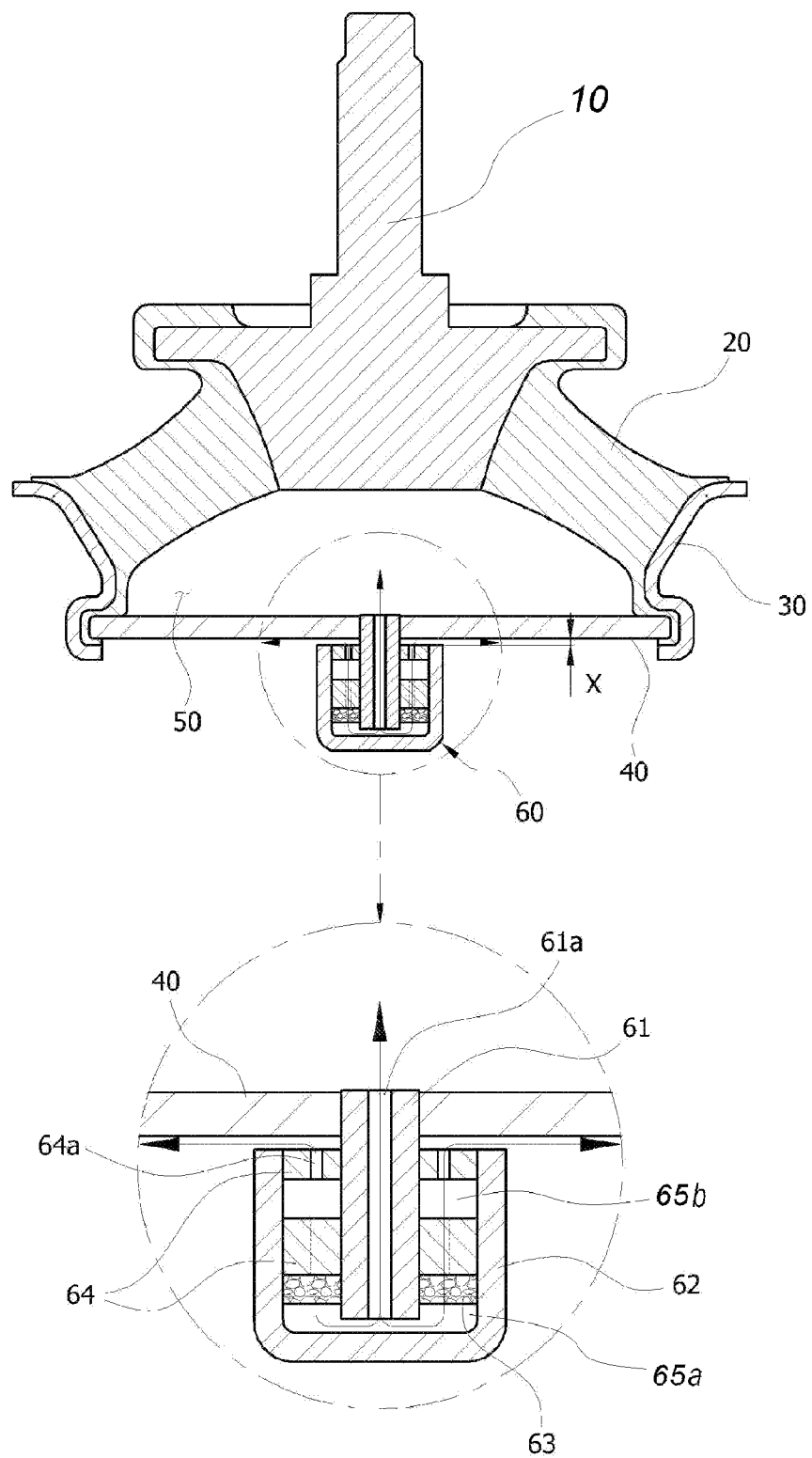
FIG. 2 is a cross-sectional view illustrating the structure of an exemplary air-damped engine mount according to the present invention.
Figure 3:
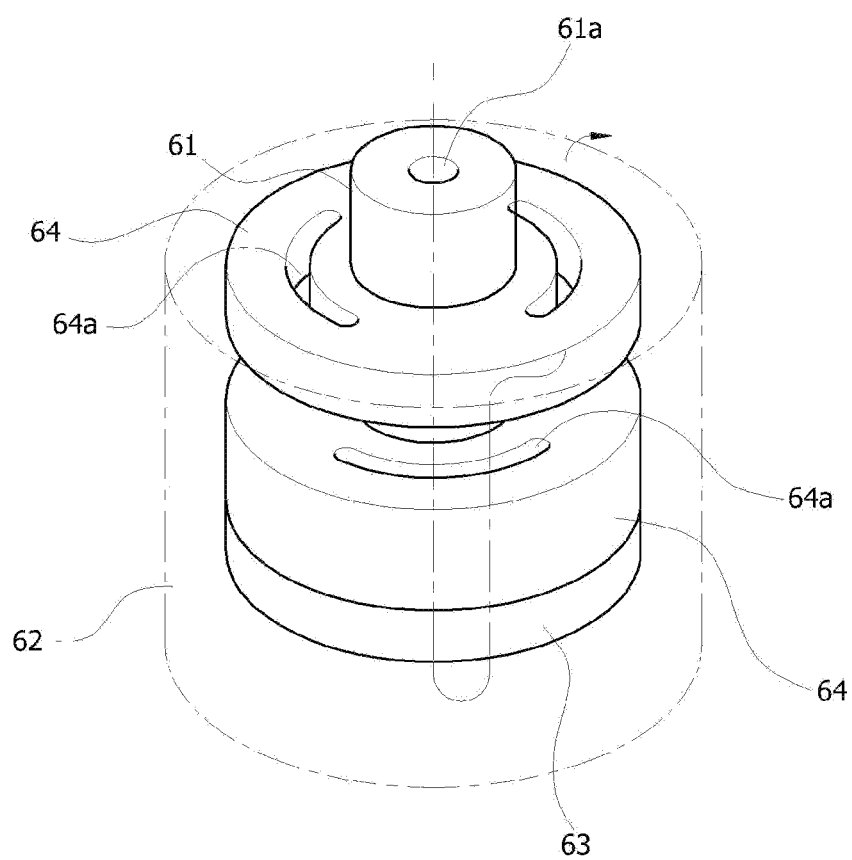
FIG. 3 is a perspective view conceptually illustrating flows of air in the filter module shown in FIG. 3.

FIG. 2 is a cross-sectional view illustrating the structure of an air-damped engine mount according to an exemplary embodiment of the present invention, and FIG. 3 is a perspective view conceptually illustrating flows of air in the filter module shown in FIG. 3.

As shown in FIG. 2, the air-damped engine mount according to various embodiments of the present invention includes a bolt 10 coupling with an engine of a vehicle, a main rubber 20 into the central portion of which the bolt 10 is fitted and coupled, a hollow main pipe 30 tightly coupled with the main rubber while supporting the main rubber 20, a cover plate 40 tightly coupled with one end of the main pipe 30 to form a damping chamber 50 in a space between the cover plate 40 and the main rubber 20, and a filter module 60 coupled with the cover plate 40, with one portion of the filter module 60 extending through the cover plate 40, such that air passes through the filter module 60 against flow resistance to enter and exit the damping chamber 50.

With the filter module 60 mounted as above, the air entering and exiting the damping chamber 50 passes through the filter module 60 against the flow resistance, which in turn regulates the air pressure inside the damping chamber 50 to thereby reduce vibration in the main rubber 20.

Here, instead of an air hole formed in the cover plate 40 to allow communication of the damping chamber 50 with the outside, the separate filter module 60 creating large flow resistance against the air is mounted on the cover plate 40. The flow resistance created by the filter module 60 changes the flow rate of the air that enters and exits the damping chamber 50 through the filter module 60. This as a result changes the pressure inside the damping chamber 50 in response to vibration in the main rubber 20, thereby damping the vibration in the main rubber 20.

Describing in more detail, for example, when the main rubber 20 is deformed downwards by vibration in the engine, the pressure inside the damping chamber 50 instantaneously increases, thereby causing the air to exist the damping chamber 50 through the filter module 60. At this time, due to the large flow resistance of the exiting air, the pressure inside the damping chamber 50 changes gradually instead of changing instantaneously. When the main rubber 20 is deformed downwards in response to the pressure changing with time, the damping chamber 50 withstands the downward deformation of the main rubber 20 using the internal pneumatic pressure thereof to thereby reduce vibration in the main rubber 20.

Accordingly, the air-damped engine mount according to various embodiments of the present invention is constructed such that the filter module 60 increases the flow resistance against air, which in turn increases the effect of damping the vibration in the main rubber 20. In addition, since the air enters and exits the damping chamber 50 through the filter module 60 unlike the related art, it is possible to prevent impurities from entering the damping chamber 50.

As shown in FIGS. 2 and 3, the filter module 60 includes a filter body 61 defining therein an air channel 61a to communicate with the damping chamber 50, a hollow filter housing 62 with one open side to receive the filter body 61 therein and a breathable porous member 63 disposed in buffering spaces 65a and 65b defined between the filter body 61 and the filter housing 62.

With the construction of buffering spaces 65a and 65b, the air flowing through the air guide hole 64a may undergo abrupt change of flow rate to cause a vortex so that the flow resistance is further increased.

In various embodiments of the present invention, the breathable porous member 63 may also be disposed in buffering spaces 65a and 65b defined between the filter blocks 64.

According to this structure, the air entering and exiting the damping chamber 50 sequentially passes through the air channel 61a of the filter body 61 and the porous member 63 to communicate with the outside through the open side of the filter housing 62. As indicated with an arrow in FIG. 2, the air exiting the damping chamber 50 passes through the air channel 61a of the filter body 61 and through the porous member 63 before exiting to the outside through the open side of the filter housing 62. In contrast, the air enters the damping chamber 50 through the reverse sequence.

Therefore, the filter module 60 according to various embodiments of the present invention is constructed to increase the flow resistance against the air while the air is passing through the air channel 61a of the filter body 61 and the porous member 63.

As shown in FIG. 2, the filter body 61 is constructed such that the distal end of the air channel 61a is directed toward and placed adjacent to the closed bottom of the filter housing 62, and the porous member 63 is disposed between the filter body 61 and the filter housing 62, particularly, in tight contact with the outer circumference of the filter body 61 and the inner circumference of the filter housing 62. With this construction, the direction of the air passing through the air channel 61a is opposite to the direction of the air flowing from the inside of the filter housing 62 through the porous member 63 to the outside. This as a result can further increase the flow resistance against the air.

Preferably, the porous member 63 can be made of a material, which has excellent breathability and a predetermined range of flow resistance. For example, the porous member 63 can be formed of a polyurethane foam based on polyurethane.

As shown in FIG. 2, a filter block 64 through which air guide holes 64a extend can be installed in the space between the filter body 61 and the filter housing 62, particularly, in tight contact with the outer circumference of the filter body 61 and the inner circumference of the filter housing 62. With his structure, the air entering the damping chamber 50 can sequentially pass through the air channel 61a of the filter body 61, the porous member 63 and the air guide holes 64a of the filter block 64 to communicate with the outside through the open side of the filter housing 62, thereby further increasing the flow resistance. The air exiting the damping chamber 50 can flow in the opposite sequence, thereby further increasing the flow resistance.

In various embodiments of the present invention, the filter block 64 may be coupled to the outer circumference of the filter body 61 or the inner circumference of the filter housing 62 so that a gap between the filter body 61 and the filter housing 62 or the filter body 61 and the filter block 64 may be formed. In this configuration, the air may be bifurcated between the air guide holes 64a and the gap to increase flow resistance.

In other embodiments of the present invention, air guide holes 64a in the adjacent filter blocks are formed to be slanted with respect to a longitudinal axis of the air channel 61a so as to increase the length of the air guide hole 64a and thus increase air resistance.

As shown in FIG. 3, a plurality of the filter blocks 64 can be arranged in the longitudinal direction of the filter body 61. Here, the air guide holes 64a in the filter blocks 64 can be arranged along the direction of the air passing through the air guide holes 64a, but not be coaxial with each other. Specifically, as shown in FIG. 3, the air guide hole 64a of the upper filter block 64 is staggered from the air guide hole 64a of the lower filter block 64 along the circumference around the central axis of the filter block 64. For example, the air guide holes 64a in the upper and lower positions can be staggered from each other at 90 degrees.

Accordingly, as indicated with an arrow in FIG. 3, for example, the air exiting the damping chamber 50 sequentially passes through the air channel 61a of the filter body 61, the porous member 63 and the air guide hole 64a of the lower filter block 64 and then turns along a predetermined circumferential section of the filter housing 62 before exiting to the outside through the air guide hole 64a of the upper block 64. This structure can increase once again the flow resistance against the air passing through the filter module 60.

For convenience in explanation and accurate definition in the appended claims, the terms "upwards" and "downwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air-damped engine mount comprising:
   a bolt;
   a main rubber into which the bolt is directly fitted and coupled;
   a hollow main pipe coupled with the main rubber and supporting the main rubber;
   a cover plate coupled with the main pipe to form a single damping chamber between the cover plate, the main pipe, and the main rubber;
   a filter module having a flow resistance, the filter module coupled with the cover plate and configured to permit air to communicate through the filter module with the single damping chamber and the outside, wherein the flow resistance against the air passing through the filter module regulates air pressure inside the single damping chamber to reduce vibration in the main rubber;
   wherein the filter module includes:
      a filter body connected to the cover plate and including an air channel therein to fluid-communicate with the damping chamber;
      a filter housing having one open side to receive the filter body therein and the other closed side spaced from the filter body by a predetermined distance to form a first buffering space therebetween; and
      at least two filter blocks, each having at least one air guide hole, respectively, to control the flow resistance, wherein the at least two filter blocks are coupled to at least one portion of the filter body and/or the filter housing therebetween in a longitudinal direction of the filter body and forms a buffering space between adjacent filter blocks of the at least two filter blocks respectively such that an air passage between the damping chamber and the outside is formed to pass through the air channel, the first buffering space, the air guide holes, and the buffering space;
      wherein cross-sectional areas of the first buffering space and the buffering space are larger than cross-sectional areas of respective air guide holes; and
   at least a breathable porous member disposed in the first buffering space, wherein the porous member is coupled to at least a portion of an outer circumference of the filter body and/or an inner circumference of the filter housing.

2. The air-damped engine mount according to claim 1, wherein the bolt is coupled to an engine of a vehicle.

3. The air-damped engine mount according to claim 1, wherein the air passage has at least one winding portion so as to increase the flow resistance.

4. The air-damped engine mount according to claim 1, wherein the porous member is made of polyurethane.

5. The air-damped engine mount according to claim 1, wherein the air guide holes in the adjacent filter blocks are formed so as not to be disposed coaxial each other.

6. The air-damped engine mount according to claim 1, wherein longitudinal axes of the air guide holes in each of the adjacent filter blocks are formed to be inclined with a longitudinal axis of the air channel with a predetermined angle so as to increase air contact time period and thus increase the flow resistance.

7. The air-damped engine mount according to claim 1, wherein the porous member is coupled to at least a portion of the outer circumference of the filter body and/or the inner circumference of the filter housing.

8. The air-damped engine mount according to claim 7, wherein the porous member is made of polyurethane.

9. The air-damped engine mount according to claim 1, wherein a filter block of the at least two filter blocks disposed near to the cover plate is spaced from the cover plate with a predetermined gap so as to increase the flow resistance.

10. The air-damped engine mount according to claim 1, wherein the open side of the filter housing is spaced from the cover plate with a predetermined gap so as to increase the flow resistance.

11. The air-damped engine mount according to claim 9, wherein the open side of the filter housing is covered with the filter block of the at least two filter blocks disposed near to the cover plate and having an air guide hole facing the cover plate.

12. The air-damped engine mount according to claim 1, wherein an air guide hole has an opening formed in one of the at least two filter blocks, the opening facing the cover plate by a predetermined distance.

* * * * *